Figure 7:
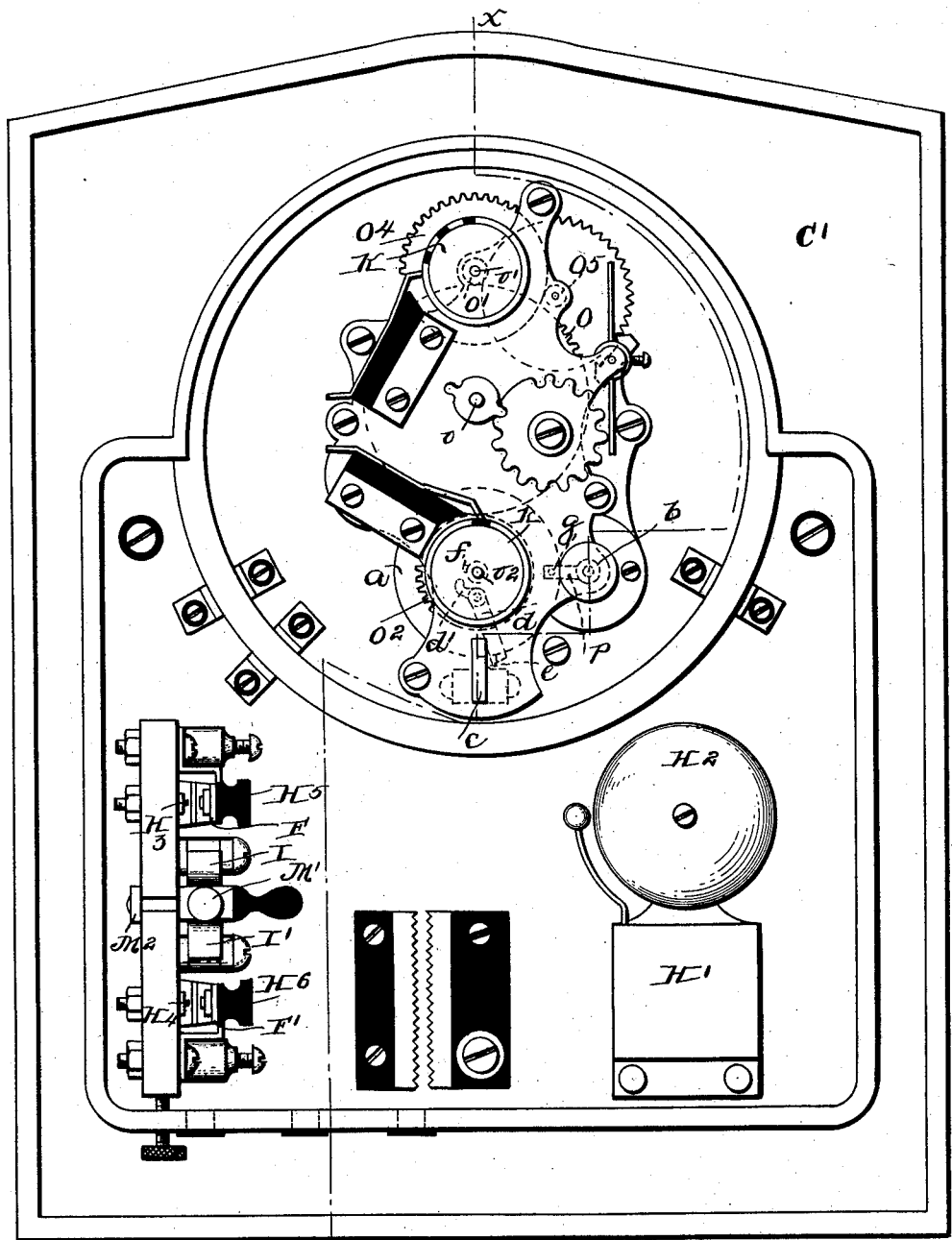

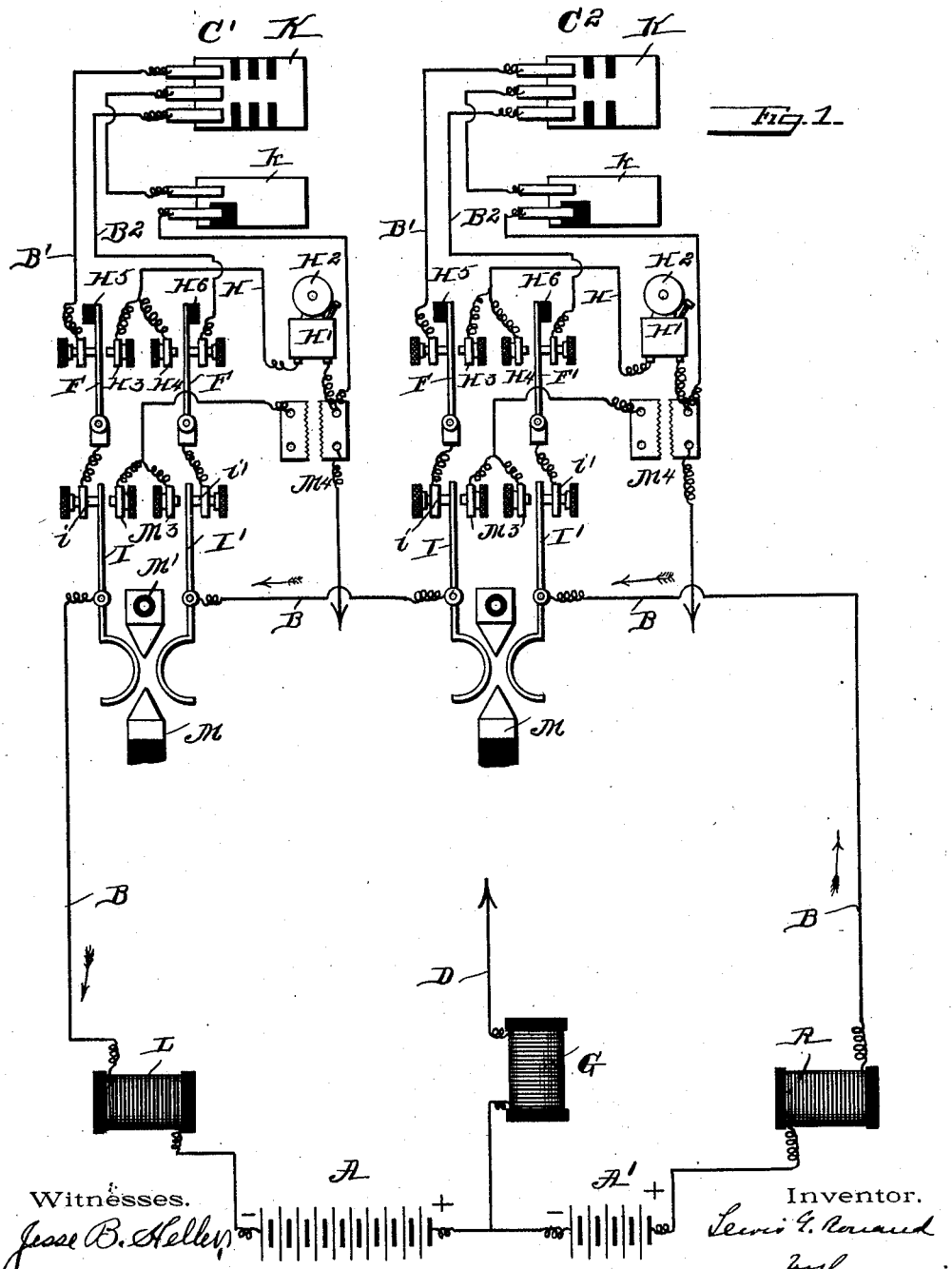

(No Model.) 4 Sheets—Sheet 2.
L. G. ROWAND.
ELECTRIC FIRE ALARM CIRCUIT AND SIGNAL BOX.
No. 568,494. Patented Sept. 29, 1896.
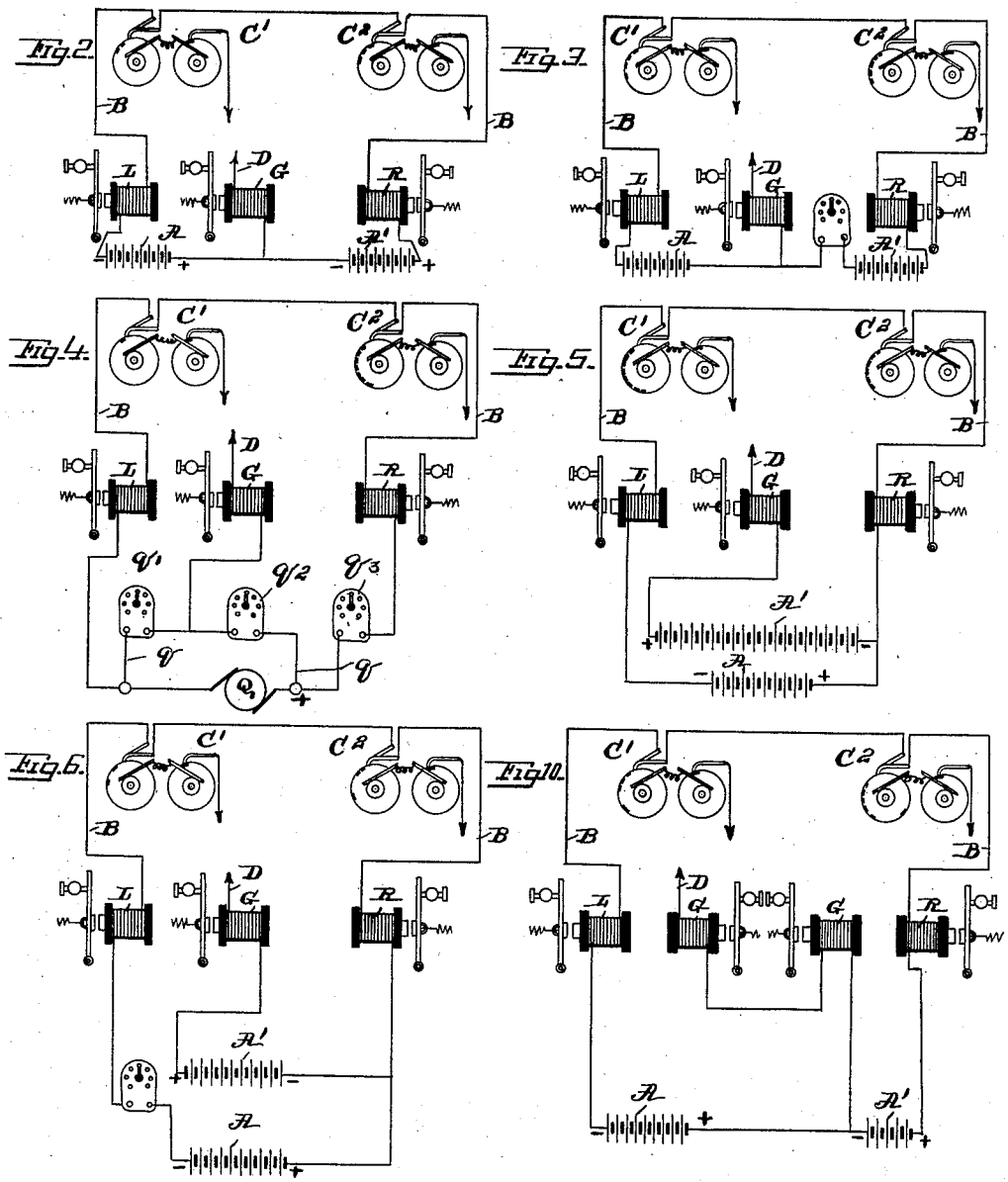
Witnesses.
Jesse B. Heller
Carol H. Deshong
Inventor.
Lewis G. Rowand
J. & Harding
Attorney.

(No Model.) 4 Sheets—Sheet 3.
L. G. ROWAND.
ELECTRIC FIRE ALARM CIRCUIT AND SIGNAL BOX.
No. 568,494. Patented Sept. 29, 1896.

Witnesses. Inventor.

(No Model.) 4 Sheets—Sheet 4.
L. G. ROWAND.
ELECTRIC FIRE ALARM CIRCUIT AND SIGNAL BOX.
No. 568,494. Patented Sept. 29, 1896.
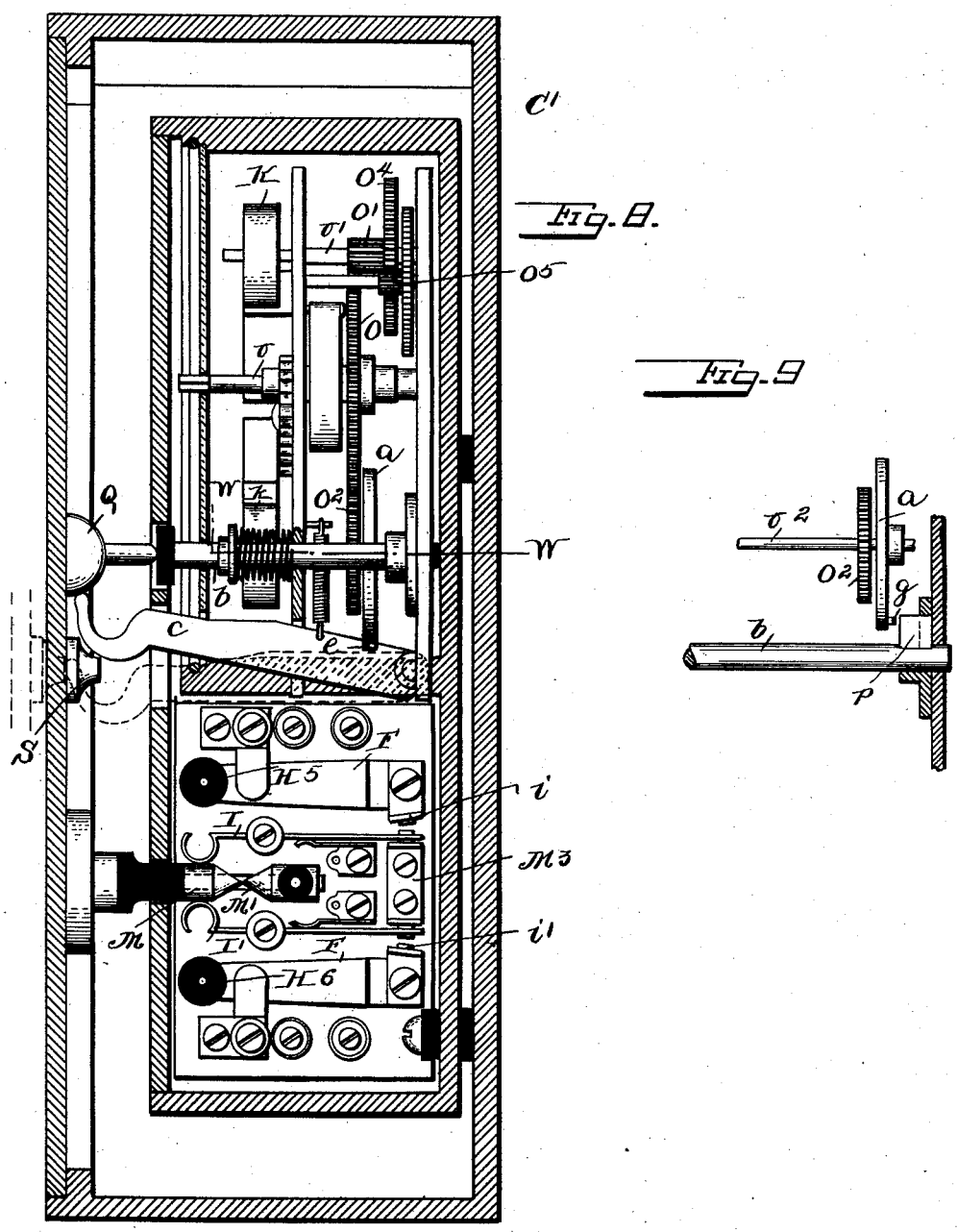
Witnesses.
Jesse B. Heller
Frank S. Busser
Inventor.
Lewis G. Rowand
J. G. Harding
Attorney.

UNITED STATES PATENT OFFICE.

LEWIS G. ROWAND, OF CAMDEN, NEW JERSEY, ASSIGNOR TO THE UNIVERSAL FIRE ALARM COMPANY, OF SAME PLACE.

ELECTRIC FIRE-ALARM CIRCUIT AND SIGNAL-BOX.

SPECIFICATION forming part of Letters Patent No. 568,494, dated September 29, 1896.

Application filed August 8, 1895. Serial No. 558,586. (No model.)

*To all whom it may concern:*

Be it known that I, LEWIS G. ROWAND, a citizen of the United States, residing at Camden, county of Camden, and State of New Jersey, have invented a new and useful Improvement in Electric Fire-Alarm Circuits and Electric Fire-Alarm Signal-Boxes, of which the following is a full, clear, and exact description, reference being had to the accompanying drawings, which form a part of this specification.

I will first describe my construction and arrangement of circuits as shown in the diagrammatic views, Figures 1 to 6.

In the drawings, Fig. 1 is a diagram of the electrical connection. Figs. 2, 3, 4, 5, and 6 are similar views. Fig. 7 is a front view of the box with the doors removed. Fig. 8 is a section on the line $x$ $x$ of Fig. 7. Fig. 9 is a detail sectional view on the line $w$ $w$ of Fig. 8, parts being shown in full. Fig. 10 is a view similar to Fig. 1 with box details omitted and two polarized relays of opposite polarity on the ground-circuit D.

In Fig. 1, A A' are two sets of batteries coupled in series on the metallic circuit B. These batteries are in the central station, and on each side of the metallic circuit are relays R and L. Also in the central station, as is well known, these relays act when the main circuit is made and broken to indicate upon bells, sounders, or tapes, one or all, or other indicating instruments, the character of the makes and breaks. Upon the metallic circuit are a series of fire-alarm boxes, two, C' C², being shown. Connected between the series of batteries A and A' is a wire D, connected to ground, which has upon it a relay G. The wire D is connected to one pole of batteries A and other pole of batteries A', thus being connected to opposite poles of the compound generator formed by batteries A and A'. The boxes C' C² have appurtenant mechanism both to automatically break and make the main-line metallic circuit and also to automatically make and break the ground connection at that point with the main-line circuit. The batteries A are more in number than the batteries A', so that the potential of the line is greater on one side of the wire D than on the other.

Now supposing the passage of the current on the main-line circuit to be in the direction of the arrows, Fig. 1, and the mechanism of one of the boxes, say box C', be operated so as to break and make the main-line circuit and also at that time to make and break a ground at that point. So far as the main circuit is concerned the relays R and L both register. So far as the ground-circuits through wire D are concerned a portion of the current from battery A passes to ground-wire D, to ground, and to the ground made at box, and then back to the other pole of the same battery, while the current through main circuit from battery A' passes along the metallic circuit to the box ground and from thence to the ground of wire D, along wire D to the opposite pole of the battery A'. Thus we have on the wire D and relay G two currents of different potentials traveling in opposite directions through two independent ground-circuits, with the exception of the portion D', common to both, and the one of highest potential is active, and the relay G responds to the make-and-break ground at the box. Thus I have a main-line metallic circuit and a current-generator with a plurality of normally open ground-circuits, having a metallic portion common to both ground-circuits connected to the main line, and when the box is operated a ground is made on the main line independent of the ground of wire D and the two ground-circuits completed.

My construction of circuits is especially adapted for the following circumstances:

First. If two boxes a resimultaneously operated, say boxes C' and C², in that case the circuit, so far as box C' is concerned, would be from battery A through the wire D to ground, to box ground C', to metallic conductor, to relay L, to opposite pole of battery A, and relay L and G would respond. So far as box C² is concerned it would be from battery A' along main metallic conductor, through relay R to the box ground of C², to ground of wire D, along wire D, through relay G, to opposite pole of battery A', and relays G and R would respond. As relay G would respond to both boxes its response would be mixed, and relays L and R would be relied upon to receive the signals of the corresponding boxes.

This construction of circuits thus enabling clear signals to be received at the main station from two boxes simultaneously operated is of great advantage.

Second. In case the main line is broken at any point, in that case, by means of the ground-circuits heretofore described, when either box is operated, a make-and-break circuit is formed through the ground-circuit, and one of the relays operates, the relay operated being dependent upon which side of the box the line is broken, and when both boxes are simultaneously operated, unless the break is between one of the boxes and the station, each box operates one of the relays, and both boxes operate upon ground-circuits relay, which of course receive a clouded signal, reliance as in the first-mentioned case, under those conditions, being placed upon the two main-line relays, each of which receives the signal from its corresponding box. Of course, if the break is between the box and station only one main-line relay, the one not broken, would respond to both boxes.

Third. If the main line become grounded for any reason and the boxes be operated consecutively the box which has the ground beyond it will register upon one of the main-line relays and the ground-circuits relay, while the other box will register only on the other main-line relay. If, under these conditions, both boxes be pulled, each box will register upon its corresponding main-line relay, and one of the boxes will register on the ground-circuits relay.

Fourth. If the main line circuit be short-circuited so as to cut out both of the boxes from the main-line circuit, then, if either or both of the boxes be operated, only the ground-circuits relay will respond. If the short circuit occur between boxes, then of course the box which is not short-circuited from the main circuit will respond as first-above described, while the other box will respond only upon the ground-circuits relay. In Fig. 1 the ground-circuits are shown as connected to a wire connecting the opposite poles of batteries A and A', and is thus in connection with opposite poles of the two batteries, and the two batteries on opposite sides of the ground-circuits are of unequal potential, and thus the potential of the main line at these points are different. In place of making the batteries of unequal potential I can accomplish the same result by the construction shown in Fig. 2, by inserting a resistance coil on one side of the ground-circuits, in which case I can use batteries of equal strength, but this construction is substantially the same as removing a portion of the battery A', because it is preventing the full amount of the current of battery A' acting on the main circuit.

As shown in Fig. 3, the batteries A and A' are of equal strength, and in this case the resistance is placed between batteries A and A'.

In Fig. 4, Q is a signal-current generator on the main line. $q$ is a shunt about the current-generator. On this shunt are resistances $q'$ and $q^2$, and on the main line is placed a resistance $q^3$. The shunt $q$ is connected with a constant ground D, and in that ground connection, as in the other figures, is the relay G. Otherwise the circuits are the same as in the other figures. In operating the devices so arranged, let us say, suppose a ground is made at $C^2$, the current passes along the line $b'$, through the resistance $q^3$, to ground at $C^2$, thence up to the constant ground D, through the relay G, to the shunt $q$, through the resistance $q'$ to the other pole of the current-generator Q. There would also be under those conditions a current passing directly from the generator, through the resistance $q^2$, through the relay G to the ground at $C^2$, thence to the left to the other pole of current supply. Therefore under those conditions we would have passing through the constant ground in opposite directions two currents of different potential or strength, and therefore to the current having the greatest strength, that is, the least resistance, on its circuit the relay G would respond and the signal would be given.

In Fig. 5 the ground-wire D is connected to the main circuit at one side of the battery B. The main circuit is of equal potential on both sides of said ground connection. In the ground connection D is placed an open-circuit battery A' of greater strength than the line-battery A. In this case the current in the ground-circuits of both the boxes C' and $C^2$ pass in the same direction.

In Fig. 6 the arrangement of circuits and batteries differs from that of Fig. 5 in that the batteries A and A' are of equal strength, and on the main circuit on the side of the battery A opposite to that to which the ground-wire is connected are placed resistances. The devices being so arranged the operation under the condition of a grounding at one of the signal-boxes, say at $C^3$, is as follows: the current from battery A passes through the relay R to the ground at $C^2$, thence to the constant ground D through the relay G.

Speaking generally, my improvement in circuits consists in the following: So far as the main line is concerned it is the same as an ordinary alarm-circuit, but by the introduction of the plurality of ground-circuits in the way in which I construct them I have two ground loop-circuits, each one of which has its own path, except so far as wire D is common to both, and thus the metallic line is divided into two parts, so that if the two boxes upon the circuit are operated separately or simultaneously so far as the ground-circuits are concerned these formed two ground-circuits, one of each including one side of a metallic loop, and there being a relay upon each side of the metallic loop, by this construction each relay will respond only to its corresponding box. Further, by this arrangement of circuits I am enabled always to signal independent of having a complete metallic circuit, as described fully when speaking of Fig. 1. Thus, as there described, the main line may be broken, in which case the ground-circuits, one or both, may still be operated.

The main line may be grounded or the main line may be short-circuited, in all of which cases, through the medium of these ground-circuits, I can receive the signal from the boxes, and in the only case that I cannot receive independent signals from the two boxes simultaneously is in the case where the main line is short-circuited so as to cut out all of the boxes. I can, if it is desired to prevent clouded signals on the ground-relay G, place two polarized relays of opposite polarity on the wire D, leading to ground, as shown in Fig. 10, one responding to the ground-circuit controlled by battery A and the other to the ground-circuit controlled by battery A'. In place of relays any receiving instrument may be used.

My invention further consists in certain constructions of the box or alarm-box whereby I can obtain the following results: First, a construction whereby I am enabled in case the wire of the main circuit should break to find on which side of the box the break occurred. This construction is shown in Figs. 1, 7, and 8, in which B' represents the main wire from one side of the loop, and B² the main wire from the other side of the loop. When the box is operative, these wires are electrically connected to the movable contacts F and F', respectively. H is a wire passing through an electromagnet H', controlling a bell H², to ground. This wire is connected by a loop to the contacts H³ and H⁴. The keys H⁵ and H⁶ are adapted to move the contacts F F', respectively, and the contacts F being adapted to be moved by its key in contact with the contact H³, and the contact F' being adapted to be moved by its corresponding key in contact with the contact H⁴. Thus when the contact F is moved in contact with the contact H³ one side of the metallic circuits is at once grounded, and, if the wire on that side is neither grounded nor broken, then through the ground-circuit H' and ground-circuits of wire D, already described, the current will be closed and the bell rung, and if the reverse is the case, that is, that that side of the loop is broken or grounded between the source of current-supply and box then the bell will not ring. The same is true with reference to contact F'. Thus I can at any time and within the box determine whether or not the main-line circuit is in proper condition, and, if not, on which side of the box the break or ground occurs.

I have also devised a means not only to prevent the current from passing normally into the box from the main circuit, but also to short-circuit the current so that no part of it can pass within the box. I accomplish this in the following manner: The main-line loops B B' pass to and are connected with the spring-jaws I I'. (See Fig. 1.) These spring-jaws are adapted in one position to rest against the contacts $i$ $i'$ within the box with which the wires B' B² are in electrical connection, in which case the current passes directly to the commutator K, and from there to the commutator $k$ in shunt, commutator $k$ being connected with ground, the main-line current returning from the commutator K to the binding-post $i'$. When these jaws I and I' are separated, they are brought out of contact with the contacts $i$ $i'$, and thus the main line is cut out from the box. I provide the following mechanism for accomplishing this result:

Of course it is necessary that when the box is open the circuit shall extend to and within the box and shall be cut off from the box when the box is closed. I therefore connect to the door of the box, but insulated therefrom, a wedge-shaped projection M, in alinement with the jaws I and I', and the projection being of such length that when the door has closed the wedge enters between the two jaws I and I', separating them from contact with the contact-points $i$ $i'$. It is sometimes desirous to cut off the main line from the box when the door is open, and I accomplish this in the following manner: Within the box and opposite to the wedge-shaped projection M on the door I place a wedge-shaped piece M', which is connected to the lever M², properly guided, so that by operating this lever I can force the jaws I I' apart and thus cut off the main-line circuit from the box. The jaws I I' are spring-operated, so that their normal position is such as to hold them closed. The wedge-shaped pieces M and M' are of electric conductive material, so that when they are placed between the jaws the current passes from one jaw to the other through them, and thus passes back to the main line.

In order to provide to make certain the cutting out of the box when the wedge is in position and to prevent the chance of failure by reason of the wedges M or M' being corroded or failing to carry the current off, I provide the central contact M³, which is in contact with the jaws I and I' when the wedges M or M' have forced the jaws apart, and this contact M³ is in electrical connection with the ground through a lightning-arrester M⁴, so that when the box is cut off from the main-line circuit ample provision is provided against any chance of current passing into the box.

I provide the following means for controlling and operating the commutators K and $k$: the commutator $k$, controlling the shunt-ground circuit and the commutator K controlling the make and break on the main-line circuit and the make and break on the shunt-line circuit.

In Figs. 7, 8, and 9 I have shown fully my method of operating the commutators. $o$ is a shaft having upon it the spring-driven gear-wheel O. The gear-wheel O meshes with the wheel O' on the shaft $o'$, and upon that shaft is the commutator-disk K. This gear-wheel O also meshes with the gear-wheel $O^2$ on the shaft $o^2$, which shaft $o^2$ carries the commutator-disk $k$. The arrangement of gearing is such that the commutator-disk K makes the desired number of revolutions dependent upon the number of repeats of signals desired, while the commutator $k$ makes one revolution.

As may be seen, the brushes on the commutator $k$ at the initial movement, one brush rests upon insulation and the other upon the active portion of the commutator, so it is only necessary that it should make a revolution and come back to that initial position, while the other commutator K is making sufficient revolutions to make the desired number of repeats of the signal. On the shaft $o'$ is the gear-wheel $O^4$, which meshes with the gear-wheel $O^5$ on the shaft of the escapement.

$a$ is a disk keyed to the shaft $o^2$. Upon this disk is a lug $e$, which is normally in alinement and rests against a pivoted spring-actuated lever $c$, the spring acting to normally hold the lever $c$ upward and in alinement with the lug $e$.

$d$ is a pivoted lever having a tailpiece $d'$, the tailpiece being in one position of the lever to be hereinafter described, in alinement with a pin or projection $f$ on the shaft $o^2$ or the hub thereof. The arrangement and position of this lever $d$ and its pivotal point is such that when the lever $c$ is pulled down to a point below the bottom of the lever $d$ the lever $d$ swings on its pivot-point, so that it rests on top of and prevents the return of the lever $c$. The lever $c$ when thus pulled down is below the lug $e$, and the spring-wheel causes the disk $a$, and with it the various gears hereinbefore described, to rotate, until the pin $f$ strikes the tailpiece $d'$ of the lever $d$, tilting it out of alinement with the lever $c$, and the spring returns the lever $c$ upward. At this time, or shortly thereafter, a pin $g$, carried by the disk $a$, strikes a projection $p$ on the horizontal plunger $b$, thus locking the mechanism. This plunger is also a spring-acting plunger, the spring acting to hold the plunger outward. This occurs at such a position slightly before the lug $e$ has struck the lever $c$. This last arrangement of locking the mechanism at this point, and not locking alone by the lug $e$ resting against the lever $c$, is to prevent a second alarm being sent in thoughtlessly, as it would require the operator, if the boxes were open, in order to send in the second alarm, to push in the lever so as to bring the projection $g$ out of alinement with the projection $p$, when the disk $a$, with its appurtenant mechanism, would revolve again a short distance until the lug $e$ struck lever $c$, and a second alarm could then be given by again pulling the lever $c$ downward. As this device of the lever is useful only when the box is open and to prevent a second alarm being heedlessly given, I provide the following means when the box is closed for automatically setting the mechanism into such a condition as to be operated by pulling the lever $c$ down, when the box is again opened. Connected to the door and in alinement with the end of the plunger $b$ is a projection Q, which, when the door is closed, strikes the end of the plunger $b$, forcing it inward and releasing the pin $g$ from engagement with the projection $p$, and allows the mechanism to move the short distance sufficient to bring the lug $e$ into engagement with the lever $c$. Of course the moment the door is opened the spring acting upon the plunger $b$ will bring it outward so that the pin $g$ shall be struck by it when in the revolution of the disk $a$ the pin $g$ reaches the projection $n$.

In order to prevent any unwarrantable interference with the fire-box and the pulling of an alarm and closing the box thereafter without waiting for the full revolution of the mechanism, I provide upon the door the projection S, which is in alinement with the end of the lever $c$ when said lever is pulled downward, but out of alinement with said lever when it is in its upward position, so that when the lever is pulled down it is impossible to close the door without breaking the lever until the lever $d$ has been tripped by the projection $f$, as before described. When the box is closed, the lug locks the lever in its upward position.

Having now fully described my invention, what I claim, and desire to protect by Letters Patent, is—

1. In combination with a metallic loop-circuit having a constant ground connection, the metallic circuit being of different potentials on opposite sides of said ground connection, a plurality of normally open ground connections with the metallic circuit, and devices equal in number and corresponding to said normally open ground connections with the metallic circuit adapted when operated to make and break its corresponding ground connection and the metallic circuit at that point, indicating instruments upon the metallic circuit on opposite sides of the constant ground connection, and indicating devices on the constant ground connection.

2. In combination with a metallic loop-circuit having a constant ground connection, the metallic circuit being of different potentials on opposite sides of said ground connection, a plurality of normally open ground connections with the metallic circuit, and devices equal in number and corresponding to said normally open ground connections upon the metallic circuit and adapted when operated to make and break its corresponding ground connection at that point, and indicating devices on the constant ground connection.

3. In combination with a tripping device for a fire-alarm signaling-box, of a projection upon the inner face of the door of said box, said projection being in alinement with said tripping device when said device is in operative position, whereby said door cannot be closed when said tripping device is in operative position.

4. In combination with a source of current supply and a main loop metallic circuit, of one or more fire-alarm signaling devices each of which is provided with a pair of movable contact-levers to one end of each of which contacts one side of the main loop-circuit is connected, and a circuit in the box including contacts in alinement with the other end of said movable contacts and normally in contact with said contacts, and a device connected to the door of said box adapted when the door is closed to enter between the movable contacts and break connection between them and the contacts of circuit within the box.

5. In combination with a source of current supply and a main loop metallic circuit, of one or more fire-alarm signaling devices, each of which being provided with a pair of movable contact-levers to one end of each of which contacts one side of the main loop-circuit is connected, and a circuit in the box including contacts in alinement with the other end of movable contacts and normally in contact with said contacts, and an electric-current conductive device connected to the door of said box adapted when the door is closed to enter between the movable contacts and break connection between them and the contacts of circuit within the box.

6. In combination with a source of current supply and a main loop metallic circuit, of one or more fire-alarm signaling devices each of which being provided with a pair of movable contact-levers, to one end of each of which contacts one side of the main loop-circuit is connected, and a circuit in the box including contacts in alinement with the other end of said movable contacts and normally in contact with said contacts, and an electric-current conductive device connected to the door of said box adapted when the door is closed to enter between the movable contacts and break connection between them and the contacts of circuit within the box, and contacts within the box in electrical connection with each other in alinement but normally out of contact with said movable contacts, but in contact when the movable contacts are moved out of contact with the box-circuit contacts.

7. In combination with a source of current supply and a main loop metallic circuit, of one or more fire-alarm signaling devices, each of which is provided with a pair of movable contact-levers, to one end of each of which contacts one side of the main loop-circuit is connected, and a circuit in the box including contacts in alinement with the other end of said movable contacts and normally in contact with said contacts, and a device connected to the door of said box, adapted when the door is closed to enter between the movable contacts and break connection between them and the contacts of circuit within the box, and contacts within the box in electrical connection with each other in alinement but normally out of contact with said movable contacts, but in contact when the movable contacts are moved out of contact with the box-circuit contacts.

8. In combination with a source of current supply and a main loop metallic circuit, of one or more fire-alarm signaling devices, each of which is provided with a pair of movable contact-levers to one end of each of which contacts one side of the main loop-circuit is connected, and a circuit in the box including contacts in alinement with the other end of said movable contacts and normally in contact with said contacts, and a movable device adapted to enter between the movable contacts and break connection between them and the contacts of circuit within the box.

9. In combination with a source of current supply and a main loop metallic circuit, of one or more fire-alarm signaling devices, each of which is provided with a pair of movable contact-levers to one end of each of which contacts one side of the main loop-circuit is connected, and a circuit in the box including contacts in alinement with the other end of movable contacts and normally in contact with said contacts, and an electric-current conductive movable device adapted to enter between the movable contacts and break connection between them and the contacts of circuit within the box.

10. In combination with a source of current supply and a main loop metallic circuit, of one or more fire-alarm signaling devices, each of which is provided with a pair of movable contact-levers, to one end of each of which contacts one side of the main loop-circuit is connected, and a circuit in the box including contacts in alinement with the other end of said movable contacts and normally in contact with said contacts, a movable device adapted to enter between the movable contacts and break connection between them and the contacts of circuit within the box, and contacts within the box, in electrical connection with each other, in alinement but normally out of contact with said movable contacts, but in contact when the movable contacts are moved out of contact with the box-circuit contacts.

11. In combination with a source of current supply and a main loop metallic circuit, of one or more fire-alarm signaling devices, each of which is provided with a pair of movable contact-levers, to one end of each of which contacts one side of the main loop-circuit is connected, and a circuit in the box including contacts in alinement with the other end of said movable contacts and normally in contact with said contacts, an electric-current conductive movable device adapted to enter between the movable contacts and break connection between them and the contacts of circuit within the box, and contacts within the box in electrical connection with each other in alinement but normally out of contact with said movable contacts, but in contact when the movable contacts are moved out of contact with the box-circuit contacts.

12. In a fire-alarm signaling-box apparatus, in combination a spring-actuated signal-operating wheel, a tripping-lever, a projection or lug moving with said wheel in alinement with said tripping-lever, and a pivoted lever adapted when the tripping-lever is operated to swing on its pivot-point and lock said lever.

13. In a fire-alarm signaling-box apparatus, in combination a spring-actuated signal-operating wheel, a tripping-lever, a projection or lug moving with said wheel in alinement with said tripping-lever, and a pivoted lever adapted when the tripping-lever is operated to swing on its pivot-point and lock said lever, there being a tailpiece to said pivoted lever, a pin moving with the signal-operating wheel and adapted in its movement to strike said tailpiece of and tilt said pivoted lever out of alinement with said tripping-lever.

14. In a fire-alarm signaling-box apparatus, in combination a spring-actuated signal-operating wheel, a tripping-lever, a projection or lug moving with said wheel normally in alinement with said tripping-lever, and a pivoted lever adapted when the tripping-lever is operated to swing on its pivot-point and lock said lever, a spring-actuated plunger, a pin moving with the signal-operating wheel in alinement with said plunger when the plunger is free, but out of alinement when the plunger is moved against the spring.

15. In a fire-alarm signaling-box apparatus, in combination, a spring-actuated signal-operating wheel, a tripping-lever, a projection or lug moving with said wheel normally in alinement with said tripping-lever, a pivoted lever adapted when the tripping-lever is operated to swing on its pivot-point and lock said lever, there being a tailpiece to said pivoted lever, a pin moving with the signal-operating wheel and adapted in its movement to strike said tailpiece of and tilt said pivoted lever out of alinement with said tripping-lever, a spring-actuated plunger, a pin moving with the signal-operating wheel in alinement with said plunger when the plunger is free, but out of alinement when the plunger is moved against the spring, the position and arrangement of the parts being such that the pin strikes the plunger after the pivoted lever is struck by the pin and before the lug strikes the tripping-lever.

16. In a fire-alarm signaling-box apparatus, in combination, a spring-actuated signal-operating wheel, a tripping-lever, a projection or lug moving with said wheel normally in alinement with said tripping-lever, a pivoted lever adapted when the tripping-lever is operated to swing on its pivot-point and lock said lever, there being a tailpiece to said pivoted lever, a pin moving with the signal-operating wheel and adapted in its movement to strike said tailpiece of and tilt said pivoted lever out of alinement with said tripping-lever, a spring-actuated plunger, a pin moving with the signal-operating wheel in alinement with said plunger when the plunger is free, but out of alinement when the plunger is moved against the spring, the position and arrangement of the parts being such that the pin strikes the plunger after the pivoted lever is struck by the pin and before the lug strikes the tilting lever, and a projection upon the door in alinement with said plunger and adapted when the door is closed to force said plunger out of alinement with its pin.

17. In a fire-alarm signaling-box apparatus, in combination, a spring-actuated signal-operating wheel, a tripping-lever, a projection or lug moving with said wheel in alinement with said tripping-lever, a spring-actuated plunger, a pin moving with the signal-operating wheel in alinement with said plunger when the plunger is free, but out of alinement when the plunger is moved against the spring.

18. In a fire-alarm signaling-box apparatus, in combination, a spring-actuated signal-operating wheel, a tripping-lever, a projection or lug moving with said wheel in alinement with said tripping-lever, a spring-actuated plunger, a pin moving with the signal-operating wheel in alinement with said plunger when the plunger is free, but out of alinement when the plunger is moved against the spring, and a projection upon the door in alinement with said plunger and adapted when the door is closed to force said plunger out of alinement with its pin.

19. In combination with a source of current-supply and a main loop metallic circuit, of one or more fire-alarm signaling-boxes each of which is provided with a pair of movable contact-levers to one end of each of which contacts one side of the main loop-circuit is connected, and a circuit in the box including contacts in alinement with the other end of said movable contacts and normally in contact with said contacts, and a movable device within the box adapted to enter between the movable contacts and break connection between them and the contacts of circuit within the box, and a projection upon the inner face of the door of the box in alinement with the last-mentioned device and adapted when said device is in the last-mentioned position to strike it and return it to its normal position when the door is closed.

In testimony of which invention I have hereunto set my hand.

LEWIS G. ROWAND.

Witnesses:
  MINNIE F. ELLIS,
  FRANK S. BUSSER.